United States Patent [19]

Benoit

[11] Patent Number: 4,958,414

[45] Date of Patent: Sep. 25, 1990

[54] REUSABLE TIE-ALL OR BUNDLE FASTENER

[76] Inventor: Edward J. Benoit, 28 Guérin Street, Boucherville, Canada, J4B 1Z7

[21] Appl. No.: 446,299

[22] Filed: Dec. 5, 1989

[51] Int. Cl.$^5$ .............................................. B65D 63/00
[52] U.S. Cl. ................................ 24/16 PB; 24/17 AP
[58] Field of Search ............... 24/16 PB, 17 A, 17 B, 24/17 AP, 30.5 P; 248/74.3; 292/318, 321, 322

[56] References Cited

U.S. PATENT DOCUMENTS

| 2,979,794 | 4/1961 | DeBartolo | 24/16 PB |
| 3,149,808 | 9/1964 | Weckesser | 24/16 PB |
| 3,261,066 | 7/1966 | Chamberlin | 24/16 R |
| 3,542,321 | 11/1970 | Kahabka | 24/16 PB |
| 3,886,630 | 6/1975 | Emery | 24/16 PB |
| 4,393,548 | 7/1983 | Herb | 24/16 PB |
| 4,501,354 | 2/1985 | Hoffman | 24/16 PB |
| 4,507,828 | 4/1985 | Furutsu | 24/16 PB |
| 4,631,782 | 12/1986 | Gecs | 24/16 PB |

FOREIGN PATENT DOCUMENTS

| 951094 | 7/1974 | Canada . | |
| 1015535 | 8/1977 | Canada . | |
| 1073640 | 3/1980 | Canada . | |
| 1177625 | 11/1984 | Canada . | |
| 0090726 | 10/1983 | European Pat. Off. | 24/16 PB |

Primary Examiner—Victor N. Sakran

[57] ABSTRACT

A reusable tie-all or bundle fastener, which comprises a single strap, made of plastic material with a socket having a passageway therethrough at one end of the tie, and a tongue with ratchet teeth on the other end adapted to slip through the passageway in the socket. There is a locking pawl in the socket which is pivoted to the socket and which has a lever so that it can be raised to release the pawl from between the strap teeth when a loop is formed from the tie-all so as to release the tie. Two or more ties can be used in combination to form an enlarged loop.

4 Claims, 3 Drawing Sheets

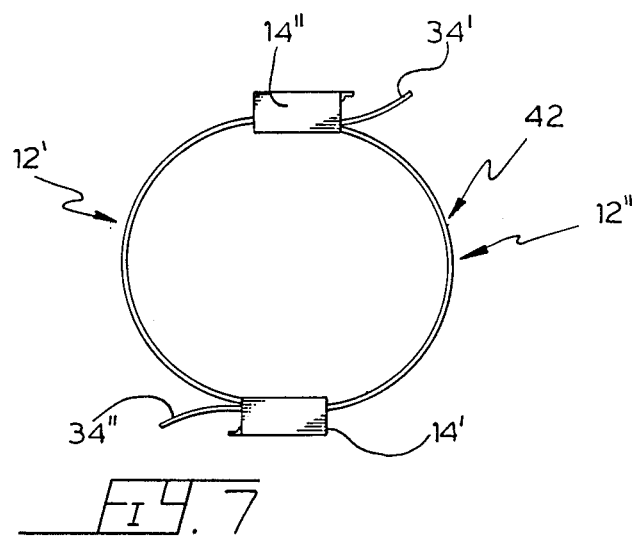

REUSABLE TIE-ALL OR BUNDLE FASTENER

FIELD OF THE INVENTION

This invention relates to a general purpose, quick-disconnect, flexible strap fastener for storing and/or transporting bundles of elongated elements such as skis, storing and/or transporting garden hose and the like, and also for tying grape vines and saplings to stakes.

BACKGROUND OF THE INVENTION

Cable tie strap fasteners are well known. They usually consist of a one-piece cable strap of flexible plastic material which comprises a toothed central region and at one end of which there is provided a socket, for engagement by the free end tip of the strap once the strap is looped onto itself. This socket includes a strap push-in channel member and a locking pawl extending transversely of this channel member and destined to releasably lockingly engage the tooth gaps of the strap. Examples of such prior art fasteners are described in the following patents:

(a) Canadian patent Nos. 951094 to Panduit Corp. (U.S.A.); No. 1015535 to USM Corp. (U.S.A.); No. 1073640 to ITW-ATECO G.m.b.H. (West Germany); and No. 1177625 to Emhart Industries inc. (U.S.A.); (b) U.S. Pat. No. 3,542,321 to Minnesota Mining and Manufacturing Co. (U.S.A.); 3,731,347 to Panduit Corp. (U.S.A.); 3,900,923 to Steven Manufacturing Co. (U.S.A.); No. 3,973,292 to Robert Yves Gabriel Bonnet (France); No. 3,991,444 and 4,191,334 both to Panduit Corp. (U.S.A.); No. 4,236,280 to Courtesy Mold and Tool Corp. (U.S.A.); No. 4,490,886 to Nifco, inc. (Japan); and No. 4,805,856 to Panduit Corp. (issued in Feb. 1989).

In most of the known cable straps, the axis of the strap in the region of the transition to the socket extends usually substantially perpendicular to the strap push-in direction. On the other hand, in e.g. Canadian patent No. 1073640, the push-in channel is arranged parallel to the direction of the strap, so that in the region of the entry of the push-through opening, the strap is led back parallel to itself; as can be seen from FIG. 1 of this latter patent, this means that the total useful diameter of the thereby formed strap loop is less than it could be, since some losses are incurred at the strap tip inlet of the socket (13). The same problem occurs in Canadian patent No. 1015535.

OBJECTS OF THE INVENTION

An object of the invention is to provide a fastener for releasably securing wires and the like or for tying a flexible bag, capable of being easily handled to encircle and secure the wires or bag neck, of easy adjustment of the fastening force and of effortless release thereof.

Another object of the invention is to provide such a fastener, consisting of two or more straps to constitute a larger diameter strap loop.

A general object of the invention is to reduce the risk of accidental release of the strap locking means embodied within the fastener.

SUMMARY OF THE INVENTION

There is accordingly disclosed a strap fastener, comprising:

(a) an elongated, flexible strap member;

(b) a channel member, anchored to an inner end section of said strap member and defining a strap passageway being substantially parallel to said strap member inner end section, said strap member defining a free outer end tip and said channel member defining a first mouth in register with said strap member inner end and a second mouth opposite the first one, wherein said strap member is to be looped and the strap tip is to engage through said second mouth forming a strap tip inlet, along said passageway to escape through said first mouth forming a strap tip outlet;

(c) locking means, to releasably lock to said channel member the strap member segment of said looped strap member extending into said passageway; and (d) adjustment means, cooperating with said locking means to selectively adjust the diameter of said strap member loop once said locking means secure said looped strap member segment into said channel member passageway.

In accordance with the invention, there is disclosed, in combination, at least two interconnected strap fasteners for releasably transversely interconnecting a number of elongated elements in a single pack, tying the neck of a single flexible bag, and the like, each fastener comprising:

(a) an elongated, flexible strap member;

(b) a channel member, anchored to an inner end section of said strap member and defining a strap passageway being substantially parallel to said strap member inner end section, said strap member defining a free outer end tip and said channel member defining a first mouth in register with said strap member inner end and a second mouth opposite the first one; wherein said strap member from one fastener is to be looped and the strap tip thereof is to engage through said second mouth of a second fastener forming a strap tip inlet, along said passageway thereof to escape through said first mouth of same second fastener forming a strap tip outlet, and vice versa for the other channel member;

(c) locking means, to releasably lock to the corresponding said channel member the strap member segment of said looped strap member extending into the corresponding said passageway; and (d) adjustment means, cooperating with said locking means to selectively adjust the diameter of said strap member loop once said locking means secure said looped strap member segment into the corresponding said channel member passageway.

BRIEF DESCRIPTION OF THE DRAWINGS

FIG. 7 is a side elevational view of two interconnected fasteners.

DETAILED DESCRIPTION OF THE INVENTION

Figure 1:
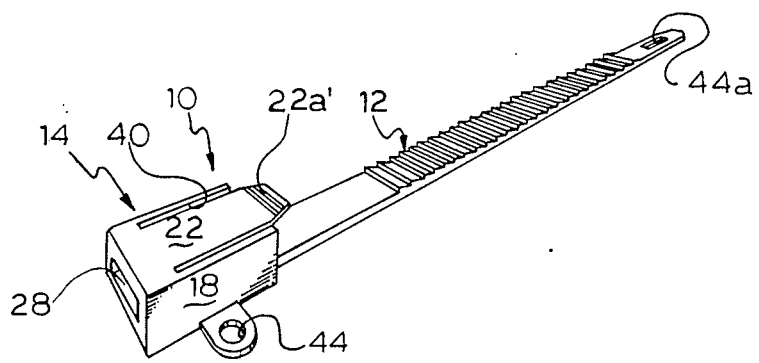
FIG. 1 is an isometric view of a first embodiment of releasable strap fastener.
Figure 2:
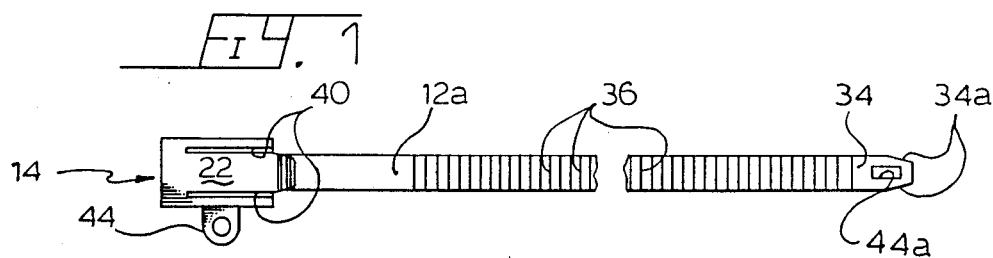
FIG. 2 is a partly broken, top plan view thereof.
Figure 3:
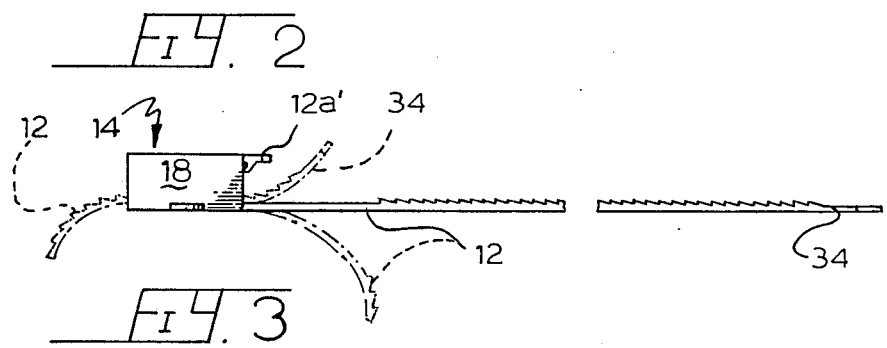
FIG. 3 is a partly broken, side elevation thereof, showing the play of the strap element of the fastener.
Figure 4:
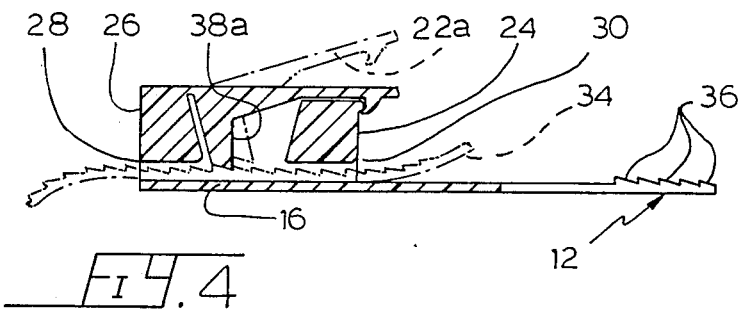
FIG. 4 is an enlarged sectional elevation thereof.

Fastener 10 consists of an elongated, flexible yet resilient strap 12 and an open socket or casing 14 at one end of the strap. Casing 14 includes a floor 16, two side walls 18, 20, a top wall 22 and inner and outer walls 24 and 26. Casing 14 is made from a semi-flexible resilient material. Floor 16 is integral to strap 12 and coplanar therewith so as to constitute an extension thereof. Outer wall 26 includes a first slit 28, adjacent and parallel to flooring 16, and inner wall 24 includes a second slit 30, adjacent and parallel to flooring 16. A passageway 32 extending through casing 14 adjacent flooring 16 allows slits 28 and 30 to communicate with each other.

Strap 12 should be long enough, and flexible enough, to enable it to form a loop. More particularly, it is envisioned that the free end tip section 34 of strap 12 be engageable through first slit 28 along passageway 32 and to escape therefrom through second slit 30. Hence, first slit 28 constitutes a strap inlet aperture, while second slit 30 constitutes a strap outlet aperture. Strap tip section 34 preferably includes bevelled edges 34a, to facilitate engagement through inlet aperture 28.

The heart of the invention lies in a releasable locking means to lock the strap 12 in its looped configuration in which strap tip section 34 is engaged into casing passageway 32. The locking means includes a plurality of "teeth" 36 i.e. of crests transversely projecting from the strap top face 12a (on the side of the casing top wall 22). Each crest 36 defines an inner (toward casing inner wall 24) face 36a orthogonal to the plane of strap 12, and an upper face 36b which outwardly downwardly slopes. The slope of upper face 36b is small, preferably smaller than 30°, while the length thereof is much longer than the height of inner face 36a, preferably by a ratio of about four to one.

From an intermediate section of the top wall 22 of casing 14 downwardly depends a flange 38 extending transversely of passageway 32 short of flooring 16 and which is separated from side walls 18, 20 by slits 40. Flange 38 defines an inner (facing the casing inner wall 24) face 38a normally orthogonal to flooring 16, and a bottom face 38b having a downwardly inwardly inclined slope relative to a plane parallel to flooring 16. The slopes of the flange bottom face 38b and of each of the strap upper faces 36b are substantially equal. Flange 38 is made of an elastic material.

Figure 5:
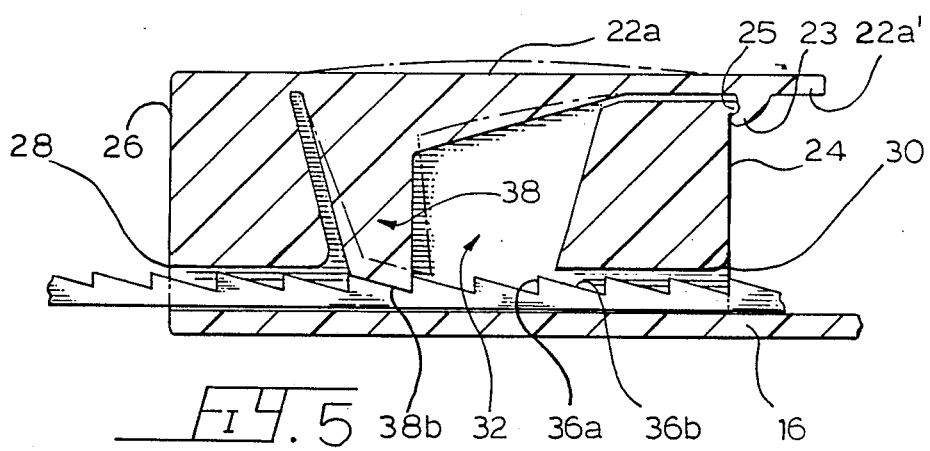
FIG. 5 is an enlarged scale view of the left portion of FIG. 4.
Figure 6:
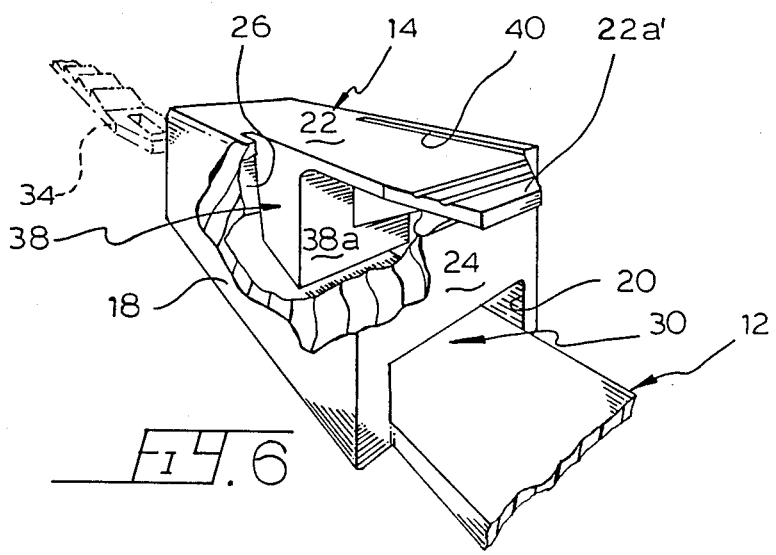
FIG. 6 is a partly broken isometric view of the fastener, at the scale of FIG. 5.

It can now be understood that strap crests 36 and casing flange 38 are destined to cooperate, in a pawl and ratchet fashion. The resiliency of the connection of flange or pawl 38 to outer wall 26 of the strap body will induce a downwardly-directed biasing force on pawl 38 to bias the latter into a trough 36b between two teeth 36. By selectively pulling strap tip 34 from outlet slit 30 (which concurrently will reduce the diameter of the strap loop configuration), strap 12 will slide through channel 32 whereby the flange bottom face 38b will slide along each registering strap through upper faces 36b and snappingly jump to a downstream one, while the flange 38 itself will yieldingly move in an up and down fashion as suggested by the dotted lines in FIG. 5.

Displacement of the strap segment through passageway 32 in the opposite direction i.e. from mouth 30 towards mouth 28, is normally impossible since the bottom edge of flange wall 38a abuts flatly against transverse strap through wall 36a, hence the ratchet locking feature.

The strap is looped under flooring 16, both to facilitate eventual pulling action of the strap tip 34 escaping from outlet slit 30 in view of adapting the diameter of the loop with the bundle to be tied, and to maximize the substantially circular area circumscribed by the looped strap.

Release of the pawl and ratchet strap locking means is effected thanks to the following features. The two lengthwise (in the direction of channel 32) slits 40, 40 made in the socket top wall 22 proximate socket side walls 18, 20 are extended from the level of flange 38 through socket inner wall 24, wherein a tongue 22a is formed which is integral with flange 38 and which includes a free end (inward) extension 22a' which protrudes from inner wall 24. Hence, tongue 12a may be temporarily lifted hingedly at its rear (proximate socket wall 26) end, which is to say, flange 38 will be concurrently lifted to disengage from strap troughs 38b, thus releasing the strap which will yield to the unlooping bias of the looped strap induced by the resiliency of the resilient strap material. Socket wall 24 remaining integral to side walls 18, 20, the former wall will therefore not lift with tongue 22a.

To positively maintain tongue 22a in down position (to keep pawl 38 in strap-locking position), tongue extension 22'a has a hook 23 snappingly engageable with the underside of a transverse ridge 25 protruding from the top of inner wall 24.

As illustrated in FIG. 7, to provide a larger diameter strap fastener, two or more fastener straps 12', 12" may be combined into a single larger strap fastener assembly, 42. Strap tip 34' of strap 12' will then engage the strap channel of socket 14" of strap 12", while strap tip 34" of strap 12" will engage the strap channel of socket 14' of strap 12'.

An ear 44 depending from a socket 14, 14', 14", and/or a hole 44a made in the strap tip, may be added to permit the hanging of the fastener to a dwelling wall.

The features of the strap fastener are:

(a) it is self-locking, i.e. that the strap locking means is automatically actuated once the strap engages the socket passageway;

(b) it is very easy to use, i.e. to install to or release from the bundle, without having recourse to a tool;

(c) it can be used several times for different purposes.

The industrial applications which are envisioned include: aerospace, automobile, clothing, shoe, construction, agriculture, domestic, hospitals, stores, shopping centers, manufacturing centers, etc... Preferred materials for the fastener include any semi-rigid resilient plastic material, such as polyethylene.

I claim:

1. A strap fastener for retaining and supporting a bundle of elongated elements, comprising:
    an elongated semi-flexible, elastic strap member defining a top wall, a bottom wall, two side edges, and first and second opposite end sections, the top wall of said strap member defining a first end section in register with said strap first end section and having a series of successively spaced, transverse serrations or grooves;
    a casing, extending outwardly from and anchored to a second end section of said strap member top wall opposite said first end section, and defining a through-channel adjacent said strap member top wall and substantially parallel thereto and forming a first free end mouth and a second opposite mouth;
    said strap member first end section constituting a free end section releasably engaged through said first mouth, into said channel, and escapingly through said second mouth so that said strap member forms a loop wherein said bundle of elements are destined to engage through said loop;

said casing defining a first free end section and an opposite second end section, two side walls transversely integral to said strap member wherein said channel extends therebetween; an elongated, semi-flexible, elastic tongue, defining a first end section, integral to said casing side walls about said casing first end section, and an opposite second free end section or lip, movable away from or towards said channel hingedly about said tongue first end section; said tongue being prebiased to a position substantially parallel to said channel, wherein the tongue is laterally shielded by said casing side walls therebetween;

said lip extending beyond the level of said second mouth, for clearing said casing side walls and thus facilitating manual handling thereof;

a tooth, depending from an intermediate section of said tongue and directed toward said channel but extending short of said strap member top wall, said tooth defining a free end edge extending partially into said channel and matingly releasably engaged with a selected registering one of said strap serrations; said interengaged tooth free end edge and strap serration being of such a shape as to retain said strap member first end section into said channel against the unlooping bias from the looped said semi-flexible elastic strap member, once the latter has been pulled tightly around said bundle of elements;

wherein release of said tooth from said selected strap serration is possible only upon pivotal motion of said tongue lip away from said channel;

and further including releasable snap lock means, to prevent pivotal motion of said tongue lip away from said channel.

2. A strap fastener as in claim 1, wherein said snap lock means consists in a further wall, interconnecting said casing side walls intermediate said tooth and said casing second end section and intermediate also said channel and said tongue; said tongue defining a first transverse hook member and said further wall defining a second edgewise hook member lockingly frictionally releasably connected with said first hook member, wherein said tongue is releasable from said strap serration only once said first and second hook members have been first released one from the other.

3. A strap fastener as in claim 1, wherein said strap member first end section further includes a through-bore, to facilitate the hanging of tools or bundles from a wall.

4. A strap fastener as in claim 1, further including an ear, transversely dependent from one of said casing side walls and having a through-bore to facilitate the hanging of tools or bundles from a wall.

* * * * *